Figure 1:
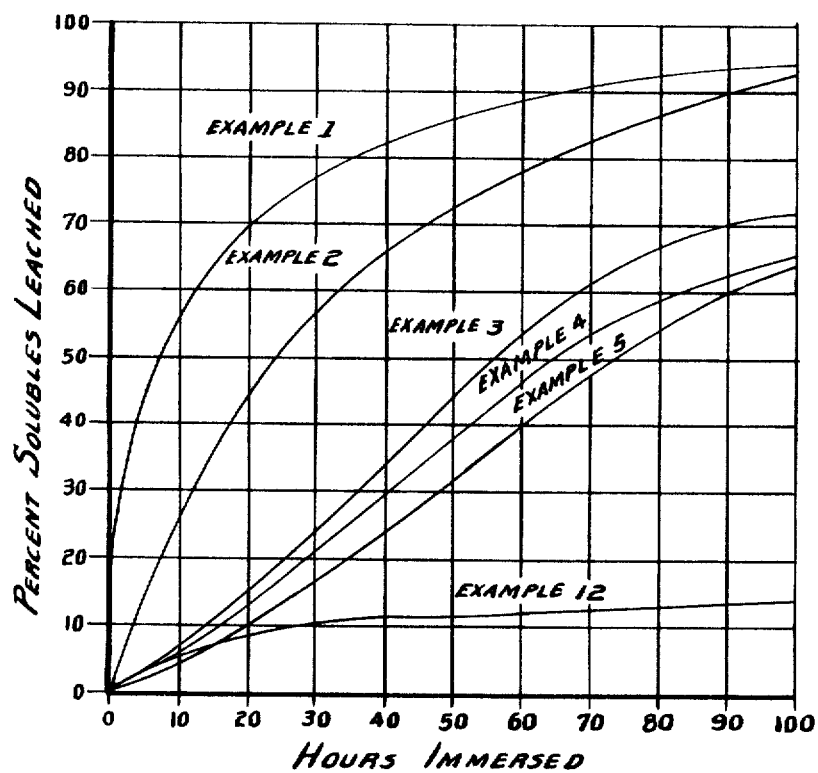

United States Patent Office 3,321,298
Patented May 23, 1967

3,321,298
TUNG OIL ENCAPSULATED CONTROLLED RELEASE WATER-SOLUBLE FERTILIZER
Verne C. Bidlack, Sr., 407 Cheltena Ave., and Verne C. Bidlack, Jr., 237 Summit Ave., both of Jenkintown, Pa. 19046
Filed Mar. 20, 1964, Ser. No. 353,536
3 Claims. (Cl. 71—64)

This invention relates to a novel coated water-soluble fertilizer and method of making the same. More specifically, the primary object of this invention concerns a method for coating water-soluble fertilizer in particulate form to provide a capsule which releases fertilizer in the soil at a controlled rate.

In general, as will be seen from the more detailed discussion below, the means employed in our invention to provide a controlled release fertilizer is one wherein tung oil is coated around particles of water-soluble fertilizer.

As is well known in the art, fertilizers made up of water-soluble compounds of nitrogen, phosphorus and potassium, etc., present certain difficulties in agricultural application. For example, since these fertilizers are water-soluble they are subject to substantial losses due to water leaching and by water running off from fields following rainfall or irrigation. It has thus been long desired in agronomic practice to provide these fertilizers in forms whereby their rate of release in the soil may be controlled in order to adjust for different combinations of soil and climatic conditions and for different crop needs.

In addition to gross losses of these fertilizers due to heavy rainfall, etc., application of these fertilizers has heretofore necessitated an inordinate amount of guesswork on the part of the user. Application of certain types of these fertilizers, such as urea, to compensate for environmental losses often promotes phytotoxic damage as well as waste. The alternative of small successive applications of these fertilizers increases fertilization costs through increased labor requirements. Further, for tall crops it is difficult to spread these fertilizers after growth has passed certain heights. Accordingly, an object of our invention is to provide water-soluble fertilizer in forms with more dependable performance for agriculture which will substantially reduce the guesswork, hazards and labor of fertilization practice.

The fertilizer requirements of many crops necessitate dosage of the soil environment with large amounts of fertilizer during the early stages of plant development. This is sometimes accomplished by continuous between-row banding and sometimes by broadcasting. These procedures are wasteful in that much of the fertilizer spread in this way never reaches the vicinity of the plant roots; hence it is unavailable to the crop. Thus, a further object of our invention is to provide water-soluble fertilizer in forms that can be applied in close contact with seeds, germinates, seedlings, and maturing plants with reduced phytotoxic damage; and in this way to eliminate the need for costly between-row and broadcast fertilization procedures.

As a further example of the utility of our invention, we have found that application of one type of water soluble fertilizer, namely urea, on crops through ditch irrigation water or by flooding results in excessive between-row weed infestation. Between-row weeds can be substantially reduced by substituting slowly soluble forms of these fertilizers, applied in the immediate vicinity of the plant, for irrigation-fertilization procedures.

An additional benefit of the coatings we use to encapsulate water soluble fertilizers is retardation of spoilage under damp storage conditions. Untreated water soluble fertilizers are characteristically hydroscopic and readily absorb moisture from their surroundings, for example the moisture vapor present in humid air. Occasionally this phenomenon converts these fertilizers into forms which flow with difficulty and which are useless in mechanical spreading equipment.

Another benefit of our coatings is to provide a vehicle for incorporating agricultural pesticides intimately with water soluble fertilizers. Heretofore simultaneous application of fertilizers and pesticides has been carried out with dry-blended mixtures of ingredients. Such mixtures have a tendency to segregate due to differences in particle size and specific gravity, resulting in uneven spreading of the active components. By incorporating pesticides in our coatings in suitable concentrations, we are able to provide fertilizers and pesticides together in homogeneous, inseparable and slowly available forms.

The typical water-soluble fertilizers in pulverized form often present problems in agricultural applications with respect to dusting, particularly using broadcasting techniques. Application of pulverized fertilizers from aircraft, especially on windy days, results in inaccurate placement of the fertilizer. This can also occur during non-airborne application which can result in inhalation by persons and animal life in the vicinity. While prilling or otherwise granulating these fertilizers help reduce these problems, actual encapsulation of these fertilizers by our coatings completely eliminates the problem.

Most fertilizers are either alkaline or acidic. Urea, for example, is an alkaline fertilizer and will contribute to the corrosion of application equipment and other equipment with which it comes in contact. Superphosphate is an acidic fertilizer with corrosive properties. Our coatings provide a protective layer between such alkaline and acidic fertilizers and metals, or animal and vegetable tissue which might be exposed to it.

Another benefit of our coated fertilizers has to do with application in the presence of other agricultural chemicals. For example, uncoated nitrogenous fertilizers, based on urea or ammonium salts, tend to lose nitrogen as volatile ammonia gas when spread on freshly limed or naturally alkaline soils. Our coated fertilizers can even be spread simultaneously with lime with minimum loss of volatile ammonia.

The desirability of these objectives is also apparent from attempts of others to modify one important type of water-soluble fertilizer, namely urea, in various ways.

Granular and prilled ureas were developed to improve flow characteristics over previously available finely divided forms. A further improvement is dusting prilled urea with pulverized inorganic materials to retard caking under humid conditions. Urea has also been coated with urea/formaldehyde to accomplish the same thing. A more recent attempt is the coating of prilled urea with quaternary ammonium salts of fatty amines to reduce the caking characteristics of urea.

It has been shown that resinous forms of urea, particularly the urea/formaldehydes, are both non-caking and slowly soluble in water and slowly decomposable in soil. However, we have found the nitrogen availability from urea/formaldehyde to be highly dependent on the bacterial and enzymatic environment of soil as well as dependent on temperature and moisture. Under some conditions the release of nitrogen compounds from urea/formaldehyde is much slower than desired and the material must be fortified with fast acting forms of nitrogen such as ammonia, urea, calcium cyanamide, ammonium nitrate, or ammonium sulfate. By use of our process, urea can be coated in such ways as to be dependent principally on moisture levels in its environment and on thickness of coating for its release of nitrogen bodies available for assimilation by plant life. Indeed, the release rates of our coated ureas can be adjusted to meet a wide range of climatic, soil and crop requirements.

Still other attempts at accomplishing our objectives were revealed by O. J. Attoe, who encapsulated water-soluble fertilizers in perforated plastic bags (U.S. Patent 3,059,373). Hansen, Watson and Farnum have coated water-soluble fertilizers with resins deposited from solvent solutions (Chemical and Engineering News, February 26, 1962). Burns and Dean propose a trough-type shield into which fertilizer is banded to protect against burning of plant roots and leaching. (Chemical and Enginnering News, January 6, 1964.) Asphaltic coatings and plastic coatings have also been tried, but their performance leaves much to be desired and suggested manufacturing procedures are cumbersome and expensive.

One of the drawbacks of prior suggestions is that they contemplate the use of flammable solvents as in the case of solvent-thinned resins and resin compounds. Accordingly, a further object of this invention is to provide a method of encapsulating water-soluble fertilizers whereby the hazards incident to the use of flammable solvents, etc., are avoided.

We accomplish our objectives, as described above, by tumbling particulate forms of water-soluble fertilizer with successive small quantities of tung oil, also known to commerce as Chinawood oil, at slightly elevated temperatures. As disclosed in Example A below, it is possible to achieve the objectives of our invention by the use of tung oil without any additives. However, for optimum results, we have found that the addition of catalytic amounts of driers to the tung oil prior to its application to the particulates of fertilizer speeds the drying of the coatings when the capsules are so prepared. Although we have used lead, manganese and cobalt salts as driers, other drying agents of equally suitable effect will be obvious to those skilled in the art of paint and varnish making. Additionally, it is possible to modify tung oil by the addition of other drying oils and resins, particularly synthetic resins. Again, on the basis of our disclosure herein, such modifications will be obvious to those skilled in the art of paint and varnish making. In order to explain our invention more fully examples of our art are described below. It will of course be understood that these examples are for the purpose of clarification and are not intended to limit the scope of this disclosure.

EXPERIMENTAL RESULTS

As stated, the process for producing the encapsulated fertilizers of this invention comprises tumbling particulate forms of water-soluble fertilizers with tung oil. It is essential that this process be carried out in the presence of an oxidizing medium, such as air, at least during the early stages of tumbling.

In Example A release rates are given for prills of urea coated with successive 3% (by weight of the fertilizer to be coated) portions of commercial-grade tung oil without the addition of driers. These coated capsules were prepared by tumbling the tung oil and prills, in the presence of air, for fifteen minutes at 150–200° F. followed by a fifteen-minute post-heating at 200° F. As stated above, it was found that the addition of catalytic amounts of driers to the tung oil prior to tumbling speeds the drying of the coatings and makes possible the use of lower temperatures when the capsules are so prepared. Thus, unless otherwise indicated, the controlled release coated water-soluble fertilizers described below in Examples 1–28 were prepared by tumbling fertilizers in particulate form with successive portions of tung oil containing 0.06% manganese, 0.03% cobalt and 0.24% lead as oil-soluble naphthenates. In Examples 1–19 and 26–29 the fertilizer used was urea, and the performance of the coating on other types of fertilizers is given in Examples 19–25.

Although the temperatures in most cases are given in the preferred range of about 120–170° F., it should be understood that these temperatures are in no way critical, and that the range can be from room temperature up to a maximum which is determined by the melting or decomposition point of either the fertilizer or the tung oil, whichever is lower in a given case. Additionally, it should be noted that the driers herein used may be supplied in forms other than naphthenates, and that, in fact, as stated previously other types of drying agents well known to those in the paint and varnish making arts such as oil-soluble metallic salts of a number of naturally occurring or synthetic acids can be used. In addition to salts of cobalt, manganese and lead, salts of such metals as vanadium, chromium, iron and others are useful. (See J. J. Mattiello, "Protective and Decorative Coatings," vol. I, 499–534, John Wiley, 1941.)

Example A

To 100 grams of commercial prilled urea, tumbling in a slowly rotating open-ended container, was added 3.0 grams of tung oil. The temperature was held at 150–200° F. for fifteen minutes followed by a fifteen-minute bake at 200° F. This process was reepated with two successive additional 3.0 gram quantities of tung oil which provided a total of 9% tung oil on the original urea prills.

Ten grams of the above preparation were immersed in 50 cc. of water and allowed to stand for two hours with occasional agitation. The supernatant liquid was evaporated to dryness and weighed which provided a measure of the amount of urea leached by water from the sample. The residual solid was then immersed in 50 cc. of new water and allowed to stand an additional tewnty-two hours after which the second supernate was evaporated to dryness and weighed. By continuation of this test, the release of solubles from the coated urea was followed over a period of 96 or more hours as shown in the table below:

AQUEOUS EXTRACTION OF UREA COATED WITH NINE PERCENT TUNG OIL

| Hours immersed: | Percent leached |
|---|---|
| 2 | 0 |
| 24 | 17 |
| 48 | 42 |
| 72 | 52 |
| 96 | 62 |

These results should be compared with Example 3 below which demonstrates the use of oil-soluble driers in an otherwise identical preparation.

Having demonstrated that tung oil can advantageously be used to accomplish our objectives, we wish to illustrate further the broad utility of our invention by means of further specific, though non-limiting, examples. These examples show that: (1) incorporation of oil-soluble driers into the tung oil speeds the coating process and permits efficient processing at lower temperatures; (2) leach rate is dependent on the number of successive coatings, the thickness of each successive coating, and the total thickness of the coating; (3) tung oil can be advantageously modified with other drying oils, synthetic resins and/or other additives for coating urea; (4) tung oil compositions are effective for slowing the release of water-solubles from fertilizers in addition to urea; (5) certain finely-divided oil-insoluble minerals can be used advantageously in conjunction with tung oil compositions for coating fertilizer.

Example 1

To 100 grams of commercial prilled urea, tumbling in a slowly rotating open-ended container, was added 3.0 grams of the fluid described above. The temperature inside the container was maintained at 120–170° F. for 30 minutes by which time the tung oil had dried to a solid coating. Addition of 0.5 gram of pulverized mineral, such as talc, at this point improved the storage properties of the preparation. The rate at which this preparation releases urea upon total immersion in water at room temperature is shown in FIGURE 1.

Example 2

100 grams of prilled urea were coated with 3.0 grams of the fluid described above and the mass was tumbled in an open-ended container at 120–170° F. until the coating had dried. To this pre-coated urea was added an additional 3.0 grams of the coating fluid, for a total of 6% coating, and the tumbling was continued at 120–170° F. for 30 minutes by which time the mass was dry and flowable. The preparation was treated with 0.5 gram of powdered talc to improve storage stability and discharged from the container. The release rate of urea from this preparation upon total immersion in water is shown in FIGURE 1.

Example 3

To 100 grams of prilled urea previously coated with two successive 3.0 gram portions of drier modified tung oil was added 3.0 additional grams of the coating fluid in the usual manner. After tumbling for 30 minutes at 120–170° F., the mass was treated with 0.5 gram of powdered talc and discharged. The release rate of urea from this preparation, coated with a total of 9% tung oil in three successive 3% portions, upon total immersion in water is shown in FIGURE 1.

Example 4

100 grams of prilled urea, coated with 9% tung oil as described in Example 3, was coated with an additional 3.0 grams of the coating oil for a total of 12% coating and finished with 0.5 gram of powdered talc in the usual way. The release rate of urea from this preparation is shown in FIGURE 1.

Example 5

In order to show how successive coatings of prilled urea with tung oil even further reduces its solubility in water, 100 grams of prilled urea coated with 12% tung oli were coated with an additional 3.0 grams of tung oil containing driers in the usual way, and finished with 0.5 gram of powdered talc. Release of urea from this preparation, coated with five successive portions of tung oil in 3% increments, and finished with 0.5% talc, is graphed in FIGURE 1.

Examples 1–5 show that successive 3% coatings of prilled urea with tung oil, modified with driers, reduces the rate at which urea is dissolved in water. It also was determined that successive coats thinner than 3% also reduce the rate of release of urea. Examples 6–8 demonstrate the effect of successive 1% coatings on prilled urea, and the results are graphed in FIGURE 2.

Example 6

Figure 2:
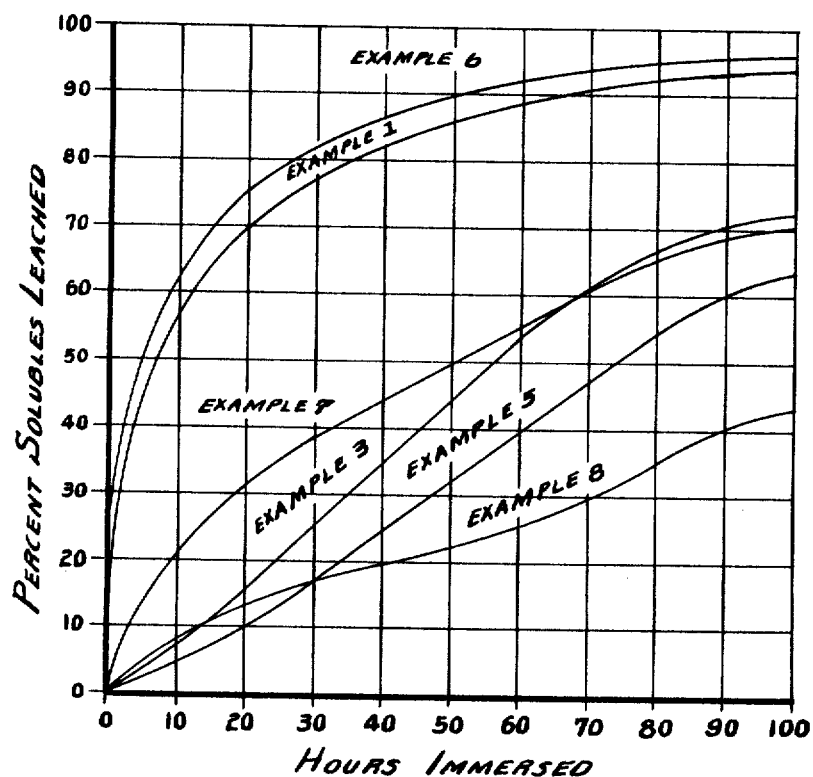

To 100 grams of prilled urea, tumbling in a slowly rotating open-ended container, was added 1.0 gram of the coating fluid described above. The temperature of the container was maintained at 120–170° F. for 30 minutes. This process was repeated two more times for a total of 3% coating, followed by a 0.5% finish coat of powdered talc. The release rate of urea from this preparation upon total immersion in water is shown in FIGURE 2.

Example 7

To 100 grams of prilled urea, tumbling in a slowly rotating open-ended container, was added 9.0 grams of the coating liquid described above in successive one-gram portions at 30 minute intervals while the apparatus was maintained at 120–170° F. Following addition and curing of the final 1.0 gram coating, 0.5 gram of powdered talc was added to impart long-term storage stability. The release rate of urea from this preparation is shown in FIGURE 2.

Example 8

100 grams of prilled urea were coated with 15 successive 1.0 gram portions of the coating fluid applied in the usual way, followed by a 0.5 gram finish coat of powdered talc. The release rate of urea from this preparation is shown in FIGURE 2.

It is apparent from Examples 6–8 that successive 1% coatings of tung oil, like successive 3% coatings, are effective in reducing the rate of release of urea in water. Each additional coat reduces the solubility of urea still further. The experimental results shown in FIGURE 2 indicate that very thick coatings can be effectively applied in increments of less than 3%.

The following examples demonstrate the behavior of prilled urea coated with successive 5–6% coatings of drier-modified tung oil.

Example 9

100 grams of prilled urea were coated with 6.0 grams of the coating material in the usual way and as a single coat. The release rate of urea from this preparation upon immersion in water is graphed in FIGURE 3.

Example 10

100 grams of prilled urea were coated with 9.0 grams of the coating material applied in two successive equal coats in the usual way. The release rate of urea from this preparation in water is shown in FIGURE 3.

Example 11

100 grams of prilled urea were coated with 15.0 grams of the coating material applied in three successive equal coats in the usual way.

Figure 3:
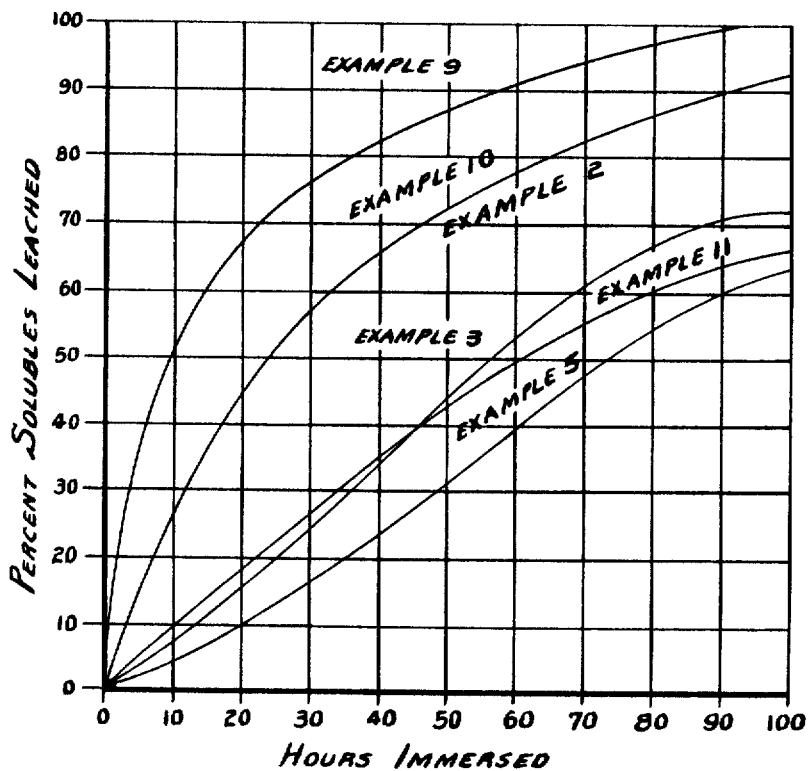

Leach rates for Examples 9–11 are compared with those for Examples 2, 3 and 5 in FIGURE 3. Again it is seen that coatings are advantageously applied in small increments. These data are summarized in the following table for further clarification.

96-HOUR WATER EXTRACTABILITY OF COATED UREAS

| Number of Coats | Total Weight of Tung Oil (Expressed as a percent of urea starting material) | | | |
| --- | --- | --- | --- | --- |
| | 3% | 6% | 9% | 15% |
| 1 | 93 | 98 | | |
| 2 | | 81 | 91 | |
| 3 | 95 | | 72 | 66 |
| 5 | | | | 62 |
| 9 | | | 69 | |
| 15 | | | | 42 |

[1] Figures in vertical columns indicate percentage of urea leached from the coated capsule after 96-hour immersion of capsule in water.

We have conducted further experiments and have coated urea with as much as 30% of tung oil modified with driers. The procedure used was the same as previously described; that is, the coating material was added to the prills while tumbling in an open-ended container, in the presence of air, with the temperature being maintained at 150° F. plus or minus 10° F. Tumbling was continued for 30 minutes after each addition of coating material. The results are summarized in the table below.

From this table it is apparent that the upper limit of leach rate reduction has not been reached with a 30% coating. Accordingly, it is obvious that much thicker coats may be applied, should even lower leach rates be desired.

AQUEOUS EXTRACTION OF UREA FROM COATED UREA PRILLS

| Hours Immersed | 1% Coating,[1] percent | 2% Coating,[1] percent | 18% Coating,[2] percent | 21% Coating,[2] percent | 24% Coating,[2] percent | 27% Coating,[2] percent | 30% Coating,[2] percent |
|---|---|---|---|---|---|---|---|
| 1 | 75 | 55 | | | | | |
| 2 | 89 | 74 | | | | | |
| 8 | 93 | 95 | 1 | 1 | 1 | 1 | 1 |
| 24 | | | 4 | | 3 | 3 | 3 |
| 48 | | | 6 | 18 | 11 | 8 | 4 |
| 72 | | | 22 | 33 | 25 | 22 | 14 |
| 96 | | | 37 | 46 | 38 | 36 | 24 |
| | | | 49 | | | | |

[1] Applied as one coat at the level indicated.
[2] Applied as successive 3% coatings.

The following example demonstrates how the tung oil coatings can be advantageously modified with synthetic resins:

Example 12

A special coating material consisting of 5.0 grams of modified phenolic resin (Beckacite 1112) dissolved in 20.0 grams of tung oil was treated with 0.48 percent of lead as the naphthenate and 0.06 percent of cobalt as the naphthenate. One hundred grams of prilled urea were tumbled with 3.0 grams of this fluid at 120–170° F. for 30 minutes by which time the coating had cured to a dry, solid state. This procedure was repeated four more times making a total of 15% coating applied in five equal, successive portions. The rate at which urea is leached from this preparation by total immersion in water is shown in FIGURE 1.

A limitation in the use of resin-modified tung oil as a coating for prilled urea is its viscosity at operating temperatures and its polymerization without causing agglomeration of the tumbling mass. Example 12 reveals just one of many combinations possible which may differ as to type of resin or as to concentration dissolved in tung oil. By raising the temperature at which operations are performed, it is possible to use higher concentrations of resins; for example, two parts tung oil with one part Beckacite 1112 or different types of resins. Optimum operating temperature depends on the type and concentration of resins being used.

The drier-modified tung oil as used for coating water-soluble materials can be further modified with other drying oils and resins to achieve economic and performance advantages. The following examples are illustrative of the many variations possible. Based upon our teaching herein, other combinations of drying oils and resins will be apparent to those skilled in the paint and varnish making art.

Example 13

100 grams of prilled urea were tumbled with three successive 3.0 gram portions of a 50:50 mixture of tung oil and dehydrated castor oil containing lead, cobalt and manganese driers. Release of urea from this preparation upon total immersion in water is somewhat faster than urea coated similarly with straight tung oil as in Example 3.

| Immersion, hours | Percent Leached | |
|---|---|---|
| | CWO [1] | CWO/DCO [2] Mixture |
| 2 | 1 | 11 |
| 24 | 20 | 45 |
| 48 | 45 | 57 |
| 72 | 62 | 68 |
| 96 | 72 | 71 |

[1] CWO = Tung oil.
[2] DCO = Dehydrated castor oil.

Example 14

Substitution of oiticica oil for the dehydrated castor oil in Example 13 resulted in a coated urea with the following leach rate:

| Immersion, hours | Percent Leached | |
|---|---|---|
| | CWO [1] | CWO/OO [2] Mixture |
| 2 | 1 | 7 |
| 24 | 20 | 42 |
| 48 | 45 | 67 |
| 72 | 62 | 77 |
| 96 | 72 | 81 |

[1] CWO = Tung oil.
[2] OO = Oiticica.

As will be understood by those skilled in the paint and varnish making art, the mixed oils disclosed in Examples 13 and 14, as well as other possible combinations, can be used as reactive solvents for many types of resins. Example 15 illustrates how this variation can be employed.

Example 15

Phenolic resins comprise a class of resins which can be blended with tung oil to advantageously coat particulate water-soluble materials as revealed in Example 12. These same resins can be used to modify blended drying oils. For example, urea, coated with three successive 3% layers of 50:50 tung oil:dehydrated castor oil containing 25% Beckacite 1112, released its solubles at the following rate:

Immersion, hours: Percent leached
2 ---------------------------------------- 14
24 --------------------------------------- 43
48 --------------------------------------- 56
72 --------------------------------------- 62
96 --------------------------------------- 66

This particular preparation released urea at about the same rate as Example 13 in which no resin was used. Thus in some cases, resin can be used to extend drying oils during periods of short supply. After a total of seven days total immersion in water, this coated urea had released only 77% of its contents.

In the same way, urea coated with three successive 3% layers of 50:50 tung oil:oiticica oil containing 25% Beckacite 1112 released its solubles at the following rate:

Immersion, hours: Percent leached
2 ---------------------------------------- 14
24 --------------------------------------- 43
48 --------------------------------------- 57
72 --------------------------------------- 64
96 --------------------------------------- 68

Seven days total immersion in water extracted 80% of the solubles.

Example 16

To illustrate further how tung oil can be advantageously modified with film-forming additives, prilled urea was coated in the usual way with three successive 3% layers of drier-modified tung oil containing 33⅓% by weight of Chlorowax 70. Chlorowax 70 is a paraffin wax containing 70% chlorine. The following rate of urea release was observed upon total immersion in water:

Immersion, hours: Percent leached
2 ---------------------------------------- 8
24 --------------------------------------- 31
48 --------------------------------------- 48
72 --------------------------------------- 60
96 --------------------------------------- 67

An advantage of using Chlorowax 70 is that shorter than ordinary coating cycles can be used. A preparation similar to the above was made at 150° F. with each tumbling step requiring only 15 minutes instead of the usual 30 minutes. It is possible to incorporate higher proportions of Chlorowax 70 if the mixture with tung oil is pre-heated to 150–170° F. before applying to the prills.

Example 17

To illustrate yet further how tung oil can be used as a reactive solvent for film-forming additives, prilled urea was coated in the usual way with drier-modified tung oil containing 33⅓% by weight of Pentalyn A, a pentaerythritol ester of rosin. The release rate of urea from this preparation upon total immersion in water is tabulated below:

Immersion, hours: Percent leached
2 ---------------------------------------- 9
24 --------------------------------------- 30
48 --------------------------------------- 41
72 --------------------------------------- 52
96 --------------------------------------- 60

Example 18

In much the same way as it is possible to use certain oils in combination with tung oil to coat fertilizer, these same oils can be modified with blends of certain resins. For example, chlorinated wax (Example 16) and rosin esters (Example 17) can be comingled in tung oil as the reactive solvent if desired. One such coating, comprising one part Pentalyn A, one part Chlorowax 70 and four parts tung oil with driers, applied as three successive 3% coats to urea released urea as follows when immersed in water:

Immersion, hours: Percent leached
2 ---------------------------------------- 8
24 --------------------------------------- 30
48 --------------------------------------- 42
72 --------------------------------------- 52
96 --------------------------------------- 60

Example 19

Tung oil may also be advantageously modified with certain types of monohydric alcohols to speed the drying process. The following table represents the results obtained using three successive three percent coatings comprising 2 parts raw tung oil and one part cetyl alcohol, tumbled with urea prills for about 30 minutes at about 150° F. in the presence of air:

Hours immersed: Percent leached
2 ---------------------------------------- 3
24 --------------------------------------- 32
48 --------------------------------------- 53
72 --------------------------------------- 66
96 --------------------------------------- 75

Our art is also applicable to coating particulated materials other than urea to accomplish similar objectives. Examples 20, 21 and 22 disclose the effect of our coating applied to commercial granular superphosphate (0–20–0), muriate of potash (0–0–60) and a commercial mixed fertilizer (8–14–6).

Example 20

100 grams of "Agrico" Coarse, granular superphosphate were tumbled with 3.0 grams of drier-modified tung oil for 30 minutes at 150–170° F. in the usual apparatus. The rate at which the solubles leached from its preparation upon total immersion in water is compared with uncoated and multiple-coated superphosphate in the table below:

COATED 0–20–0
[Percent Leached]

| Immersion, hours | Number of Coats [1] | | | | | |
|---|---|---|---|---|---|---|
| | 0 | 1 | 2 | 3 | 4 | 5 |
| 1 | 23 | 18 | 3 | | | |
| 2 | 29 | 26 | 5 | 1 | 0 | 0 |
| 24 | 31 | 31 | 27 | 3 | 0 | 0 |
| 48 | 32 | 32 | 31 | 8 | 2 | 1 |
| 72 | 32 | 32 | 32 | 12 | 5 | 2 |
| 96 | 32 | 32 | 32 | 16 | 7 | 5 |

[1] Applied as individual 3% coatings.

Although this preparation was made under the same conditions as the urea in Examples 1–5, it is possible to coat non-melting fertilizers such as the super phosphate above at temperatures in excess of 170° F. in order to shorten the processing cycles. These results again demonstrate the pronounced effect of successive coatings to slow the rate of dissolution of material from water-soluble compositions. This principle and procedure porvides a way of controlling the feeding rate of fertilizer ingredients.

Example 21

Many species of plant life can absorb potassium salts far in excess of actual requirements. This phenomenon, known as "luxury consumption," is wasteful and is a common occurrence in areas having thin soils which require heavy potash dosage to assure adequate potassium availability during rainy seasons. To provide potash, which must be transported from distant mines to agricultural areas, in more efficient forms, we also coat granular, water-soluble potassium salts, for example muriate of potash. Leaching data for muriate of potash, coated in the usual way with drier-modified tung oil, are shown in the table below:

COATED 0–0–60
[Percent leached]

| Immersion, hours | Number of Coats [1] | | |
|---|---|---|---|
| | 0 | 1 | 3 |
| 1 | 96 | 80 | |
| 2 | 100 | 100 | 6 |
| 24 | 100 | 100 | 26 |
| 48 | 100 | 100 | 40 |
| 72 | 100 | 100 | 54 |
| 96 | 100 | 100 | 65 |

[1] Applied as individual 3% coatings.

Additional coatings reduced the rate at which muriate of potash dissolved even further. (Again because muriate of potash is a high melting solid it is possible to use higher processing temperatures advantageously.)

Example 22

Our process is also applicable to commercial mixed fertilizer. As an example, we have coated commercial 8–14–6, screened to 10–20 mesh, with drier-modified tung oil containing 25% Beckacite 1112, a phenolic resin. This patricular fertilizer is quite porous and requires more than the usual number of coats to produce the desired resistance to water leaching. Leach data is shown below:

COATED 8-14-6

[Percent leached]

| Immersion, hours | Number of Coats [1] | | |
|---|---|---|---|
| | 0 | 5 | 7 |
| 2 | 25 | 17 | 1 |
| 24 | 31 | 30 | 10 |
| 48 | 33 | 33 | 16 |
| 72 | 34 | 34 | 20 |
| 96 | 34 | 34 | 23 |

[1] Applied as individual 3% coatings.

*Examples 23, 24, 25*

Mixed N-P-K fertilizers that are porous require more than the usual number of coats to reduce the water leach rate to advantageous levels (see Example 22). However, mixed fertilizers having initially hard, non-porous surfaces such as those in the table below require relatively fewer costs:

| | Immersion in Water | | | |
|---|---|---|---|---|
| | 2 hrs. | 24 hrs. | 48 hrs. | 96 hrs. |
| Example 23: Baugh 16-8-8: | | | | |
| A Uncoated, percent | 74 | 82 | 83 | |
| B Coated,[1] percent | 2 | 18 | 30 | 44 |
| Example 24: Armour 15-15-15: | | | | |
| A Uncoated, percent | 89 | 90 | | |
| B Coated,[1] percent | 0 | 1 | 2 | 6 |
| Example 25: Smith-Douglass 8-8-8: | | | | |
| A Uncoated, percent | 38 | 50 | 52 | 54 |
| B Coated,[1] percent | 0 | 1 | 2 | 6 |

[1] Coated with five successive 3% coatings comprising 2 parts of tung oil and 1 part of Beckacite 1112.

*Examples 26, 27, 28*

As indicated above, we have found it desirable to dust the coated fertilizers to improve their ability to be stored. In addition, we have utilized colored pigments to enhance the appearance of the capsules and to provide easy identification of various compositions. For this purpose such finely divided minerals as aluminum, titanium dioxide, chromium oxide, iron oxides and others are useful. Although generally added to the capsules after the coatings are applied, these pigments can also be incorporated directly into the coating material if desired.

We have discovered that finely divided graphite, mica and sulfur are not only useful for dusting and pigmentation purposes but also have a significant and unexpected effect on the release of fertilizer from the coated capsules.

The coating vehicle used for our pigmented preparations consisted of two parts of drier-modified tung oil and one part of phenolic resin (Beckacite 1112). Use of this fluid, with and without sulfur, mica or graphite, is described in the following examples:

*Example 26*

100 grams of prilled urea were coated with three successive 3.0 gram portions of the above fluid in the usual way.

*Example 27*

100 grams of prilled urea were coated with three successive 3.0 gram portions of the above vehicle in the usual way except that 1.0 gram of flowers of sulfur was dusted onto the tumbling mass between the first and second coats, 1.0 gram between the second and third coats, and 1.0 gram following the third coat.

*Example 28*

100 grams of prilled urea were coated with three successive 3.0 gram portions of the above vehicle in the usual way except that 0.5 gram of graphite (McGee G-1) was dusted onto the tumbling mass between the first and second coats, 0.5 gram between the second and third coats and 0.5 gram following the third coat.

*Example 29*

100 grams of prilled urea were coated with three successive 3.0 gram portions of the above vehicle in the usual way except that 0.3 gram of 40-mesh mica (Wagner) was dusted onto the tumbling mass between the first and second coats, 0.3 gram between the second and third coats and 0.3 gram following the third coat.

Release of urea from the above four preparations on total immersion in water is compared in the following table:

LEACH RATES FOR COATED UREA WITH AND WITHOUT ADDED SULFUR, GRAPHITE OR MICA

| Hours Immersed | Example 26 (no pigment), percent | Example 27 (sulfur added), percent | Example 28 (graphite added), percent | Example 29 (mica added), percent |
|---|---|---|---|---|
| 2 | 4 | 2 | 2 | 1 |
| 24 | 23 | 19 | 25 | 21 |
| 48 | 35 | 30 | 34 | 30 |
| 72 | 45 | 35 | 37 | 35 |
| 96 | 55 | 40 | 40 | 40 |

The data show that dusting with sulfur, graphite or mica between coats of tung oil compositions slows the release of urea compared to non-dusted coated urea after four days immersion in water.

Extension of the principle disclosed above is possible. The technique of dusting between coats would obviously be applicable to coated urea having only one or two coats as well as more than three coats. The principle is also applicable to fertilizers other than urea. We have also pre-mixed sulfur, graphite or mica directly with the vehicle with comparable results.

We have not as yet fully explored the limitations of the use of sulfur, mica and graphite with our fertilizer coatings. For example, sulfur is available in forms other than flowers of sulfur; graphite is available in different particle sizes and surface treatments; and mica is available in various forms and mesh sizes.

We believe that the hydrophobic nature and laminar structure of sulfur, mica and graphite may be responsible for the behavior observed. This would indicate that other solids, insoluble in tung oil compositions, with similar characteristics would work equally well.

The practical use of our coated fertilizer materials can be demonstrated with the coated urea described in Example 5. Weighed portions of this material were spread evenly on clay garden soil in individual plastic trays to which equal quantities of water had been added to simulate a heavy rainfall. Periodically the urea content of the prills in successive trays was measured with the following results:

| Exposure, hours | Percent Urea Remaining in Prills | |
|---|---|---|
| | Uncoated Urea | Coated Ex. 5 |
| 2 | 30 | 100 |
| 12 | 0 | 82 |
| 24 | | 51 |
| 48 | | 27 |
| 96 | | 8 |

This same fertilizer was spread at a rate of 5.0 grams per square foot on the surface of sand in which hybrid tomato seeds had been planted. Emergence of seedlings was first observed after 15 days of continuous capillary watering regardless of whether the urea was coated or uncoated. Two weeks after emergence, 80% of the seedlings fertilized with coated urea were thriving; but 100% of those fertilized with uncoated urea were dead.

On extremely heavy application—25 grams per square foot—emergence failed to occur with uncoated urea; but a 50% yield of seedlings was obtained using the coated urea. This clearly demonstrates the reduced phytotoxicity of our coated fertilizers.

A similar experiment with turf grass seed indicated that germination and emergence is about the same regardless of whether the urea is coated or uncoated. However, after growth had proceeded for two months, the grass fertilized with uncoated urea 8 lbs. of nitrogen per 1000 square feet, turned yellow-to-brown indicating starvation. The grass fertilized with coated urea, 8 lbs. of nitrogen per 1000 square feet, was still lush, green and thriving.

The above several examples outline the general principles and preferred modes whereby water soluble fertilizers may be coated with tung oil compositions to reduce and control the rate of disintegration, dissolution and decomposition of such fertilizers in the presence of moisture. It will be understood, of course, that the present invention, as described and exemplified, is susceptible to various changes and modifications which may be made without any departure from the general principle or spirit of the invention. For example, based upon the teachings herein, it will be obvious to those skilled in the paint or varnish making arts that the tung oil coatings can be modified with other proportions of the drying oils described herein, and that other drying oils can be used. Further, it will be understood by the aforementioned artisans that the tung oil and mixed oils described herein can serve as reactive solvents for a wide variety of resins in a wide choice of concentrations to accomplish the objectives of the present invention. Accordingly, it is intended to claim the present invention broadly, as well as specifically, as indicated in the appended claims.

Having thus described our invention, we claim:

1. A capsule for the controlled release of fertilizer comprising an inner core of water-soluble fertilizer and an outer coating consisting essentially of tung oil.

2. A capsule in accordance with claim 1 wherein the outer coating contains additionally a finely divided oil insoluble mineral selected from the class consisting of sulfur, graphite and mica.

3. The process for the production of a capsule for the controlled release of fertilizer comprising the steps of
    (1) admixing tung oil with a water-soluble fertilizer in particulate form in the absence of a solvent, and
    (2) agitating said admixture in the presence of air until the tung oil forms a dry coating around an amount of said particulate fertilizer.

References Cited by the Examiner

UNITED STATES PATENTS

| | | | |
|---|---|---|---|
| 1,648,861 | 11/1927 | O'Barr. | |
| 2,008,469 | 7/1935 | Prince | 71—64 |
| 2,155,499 | 4/1939 | Lawson. | |
| 2,399,987 | 5/1946 | Cordie et al. | 71—64 |
| 3,050,385 | 8/1962 | Parker | 71—64 |
| 3,186,828 | 6/1965 | Baarson et al. | 71—64 |
| 3,206,297 | 9/1965 | O'Connor | 71—64 X |

FOREIGN PATENTS

| | | |
|---|---|---|
| 641,553 | 5/1962 | Canada. |

DONALL H. SYLVESTER, *Primary Examiner.*

R. BAJEFSKY, *Assistant Examiner.*

UNITED STATES PATENT OFFICE
CERTIFICATE OF CORRECTION

Patent No. 3,321,298                                           May 23, 1967

Verne C. Bidlack, Sr., et al.

It is hereby certified that error appears in the above numbered patent requiring correction and that the said Letters Patent should read as corrected below.

Column 3, line 25, for "Enginner" read -- Engineer --; column 4, line 3, after "drying" insert -- rate --; line 37, for "reepated" read -- repeated --; line 47, for "tewnty" read -- twenty --; column 5, line 54, for "oli" read -- oil --; column 6, in the title to the table, line 1, for "UREAS" read -- UREAS[1] --; column 10, line 33, for "porvides" read -- provides --; line 75, for "patricular" read -- particular -- column 11, line 23, for "costs" read -- coats --.

Signed and sealed this 21st day of November 1967.

(SEAL)
Attest:

Edward M. Fletcher, Jr.
Attesting Officer

EDWARD J. BRENNER
Commissioner of Patents